H. ELLIOTT.
Machine for Crozing Staves.
No. 86,912. Patented Feb. 16, 1869.
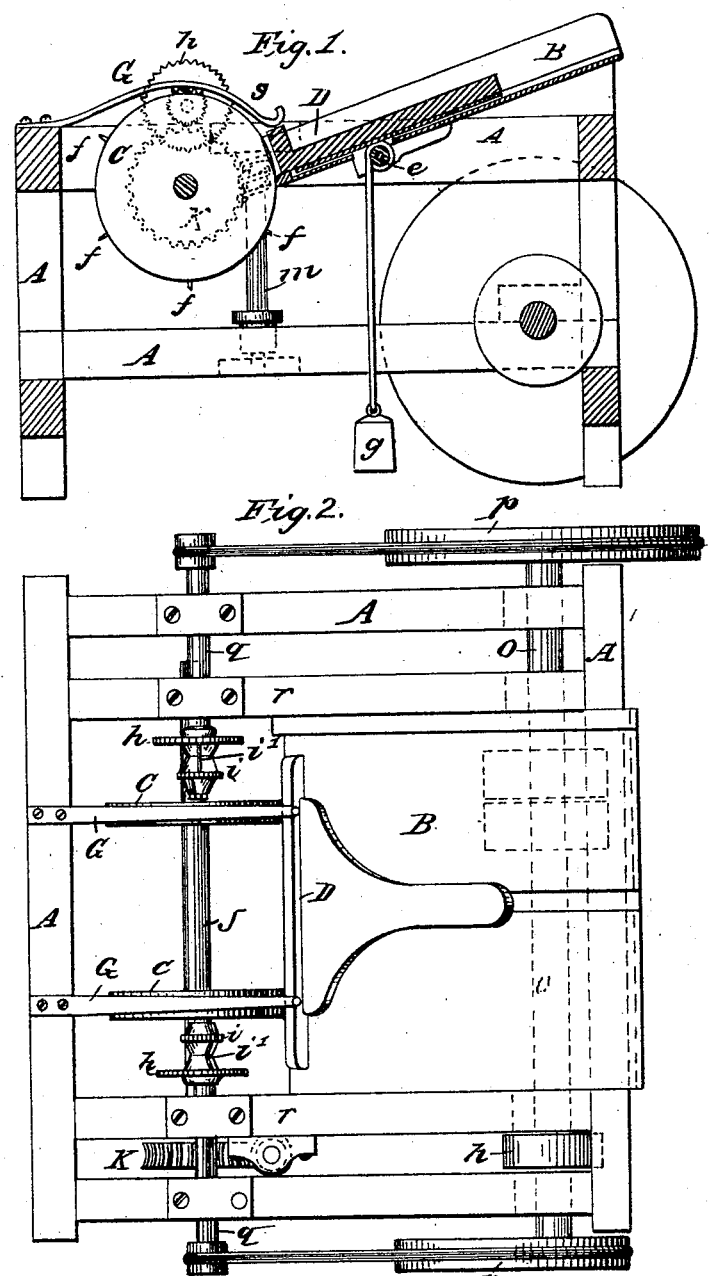
Witnesses:
Amos A. Stevens
H. S. G. Wilde.
Inventor:
Harrison Elliott

HARRISON ELLIOTT, OF BOSTON, ASSIGNOR TO HIMSELF AND AMOS A. STEVENS, OF SAME PLACE, ASSIGNORS TO HARRISON ELLIOTT AND JONATHAN SHERMAN, JR., OF FARMINGTON, MASSACHUSETTS.

Letters Patent No. 86,912, dated February 16, 1869.

IMPROVEMENT IN MACHINES FOR CROZING STAVES.

The Schedule referred to in these Letters Patent and making part of the same.

Be it known that I, HARRISON ELLIOTT, of Boston, in the county of Suffolk, and State of Massachusetts, have invented a new and useful Improvement in Machines for Chamfering and Crozing Staves for Barrels, Casks, &c.; and I do hereby declare the following to be a full, clear, and exact description of the same, reference being had to the accompanying drawings, making a part of this specification, in which—

Figure 1 represents a vertical longitudinal section of a machine embodying my invention.

Figure 2 is a plan view of the same.

The object of my invention is to provide a machine for chamfering, crozing, and cutting off, to a uniform length, staves for barrels, casks, &c., all in one operation; and the invention consists in the employment of a sliding frame, operated by a weight, in connection with two circular disks, provided on their circumference with pins, or studs, which serve to take up and carry forward the staves during the cutting-operation, the staves being held upon the said disks by means of springs or elastic pressure-bars while being cut, and then are allowed to drop off from the said disks, as the latter rotate, and when the cutting-operation is finished.

Referring to the drawings—

A A represent the frame, which may be of any suitable size or shape.

B is an incline feed-board, upon which the staves are placed, to be fed to the disks or wheels C C.

Upon the feed-board B is arranged a sliding frame, D, which may be attached to the same by means of a tongue and groove.

A forward motion toward the disks C C is imparted to the frame D by means of a cord and weight, $g$, the end being attached to the under side of the frame D, and passing over a pulley, $e$, as shown.

C C represent two disk-wheels, mounted upon a horizontal shaft, $j$, having its bearings in the inner portions $r\ r$ of the frame.

Upon one end of the shaft $j$ is a worm-gear, which engages with an endless screw on a vertical shaft, $m$, to which motion is imparted by means of a band from any moving parts of the machine.

On the periphery of the disk-wheels C C, is a series of projections or pins, so arranged as to take up the staves as they are fed from the inclined table B, and carry them forward, to be acted upon by the cutters, after which they drop from the machine.

Over each disk-wheel is arranged a spring or pressure-bar, G, attached at one end to the rear of the frame, and extending to the front portion of the feed-frame D, for the purpose of retaining the staves upon the disk-wheels, as they are brought under the action of the cutters.

Upon each side of the upper rear portion of the frame are arranged two shafts or spindles $q\ q$, on the inner ends of which are cutters $i\ i'$, so formed as to cut the recess in, and chamfer the inner ends of the staves.

$h\ h$ are saws, for sawing off the staves to a uniform length.

The cutters and saws may be adjusted further from or nearer to each other, so as to cut and chamfer staves of different sizes.

The staves being placed upon the inclined feed-board B, the frame D is drawn back, and placed against the rearmost stave.

The weight $g$ will serve to draw the frame D down, and thus feed the staves to the disk-wheels C C, by which the staves are successively carried forward, and subjected to the operation of the saws and cutters, and then pass over to the rear of the machine, and drop down from the same.

What I claim as my invention, and desire to secure by Letters Patent, is—

The inclined feed-table B and weighted feed-frame D, in combination with the disk-wheels C C, feed-pins, and retaining-springs G G, operating in the manner and for the purpose substantially as described.

In testimony whereof, I have signed my name to this specification, in the presence of two subscribing witnesses.

HARRISON ELLIOTT.

Witnesses:
AMOS A. STEVENS,
J. H. ADAMS.